US007680280B2

(12) United States Patent
Nonaka et al.

(10) Patent No.: US 7,680,280 B2
(45) Date of Patent: Mar. 16, 2010

(54) ELECTRONIC DEVICE, CONTROL METHOD THEREOF, SECURITY PROGRAM AND OTHERS

(75) Inventors: Yoshiya Nonaka, Kawagoe (JP); Yoshio Sekine, Tokyo (JP); Nobuo Tarui, Kawagoe (JP); Noritaka Nii, Kawagoe (JP); Ryoji Sugino, Tokyo (JP); Masashi Aoyama, Tokyo (JP); Hirobumi Iwaji, Kawagoe (JP); Takeshi Mutoh, Kawagoe (JP)

(73) Assignees: Pioneer Corporation, Meguro-ku, Tokyo (JP); Tech Experts Incorporation, Ohta-ku, Tokyo (JP)

( * ) Notice: Subject to any disclaimer, the term of this patent is extended or adjusted under 35 U.S.C. 154(b) by 530 days.

(21) Appl. No.: 10/591,420

(22) PCT Filed: Mar. 2, 2005

(86) PCT No.: PCT/JP2005/003536

§ 371 (c)(1),
(2), (4) Date: Sep. 1, 2006

(87) PCT Pub. No.: WO2005/085975

PCT Pub. Date: Sep. 15, 2005

(65) Prior Publication Data

US 2007/0172064 A1 Jul. 26, 2007

(30) Foreign Application Priority Data

Mar. 3, 2004 (JP) .............................. 2004-058444

(51) Int. Cl.
*H04L 9/00* (2006.01)
*H04L 9/10* (2006.01)
*H04L 9/30* (2006.01)

(52) U.S. Cl. ........................ 380/255; 380/278; 380/281; 380/285; 380/258; 713/172; 713/156; 713/189; 726/35; 726/34; 726/9

(58) Field of Classification Search ....................... None
See application file for complete search history.

(56) References Cited

U.S. PATENT DOCUMENTS 5,774,546 A * 6/1998 Handelman et al. ......... 380/227

(Continued)

FOREIGN PATENT DOCUMENTS

JP 2002-029320 1/2002

(Continued)

*Primary Examiner*—Syed A. Zia
(74) *Attorney, Agent, or Firm*—Drinker Biddle & Reath LLP (57) ABSTRACT

An electronic device, a control method thereof and a security program are provided which are capable of preventing or suppressing the theft of the electronic device.

The electronic device comprises mounting means for loading a portable recording medium and encrypted information write means for encrypting predetermined information using an encryption key unique to the electronic device and writing the encrypted information in the recording medium. The electronic device further comprises encrypted information read means for reading the encrypted information recorded in the recording medium in the case where the recording medium is loaded in the mounting means, decryption execution means for executing the decryption of the encrypted information using the encryption key, and control means for setting the electronic device in usable mode in the case where the encrypted information is decrypted by the decryption execution means.

6 Claims, 9 Drawing Sheets

U.S. PATENT DOCUMENTS

| | | | |
|---|---|---|---|
| 6,564,056 B1* | 5/2003 | Fitzgerald | 455/435.1 |
| 6,904,522 B1* | 6/2005 | Benardeau et al. | 713/156 |
| 7,260,726 B1* | 8/2007 | Doe et al. | 713/189 |
| 7,360,240 B2* | 4/2008 | King et al. | 726/9 |
| 7,496,201 B2* | 2/2009 | Westin | 380/258 |
| 7,519,184 B2* | 4/2009 | Kayashima et al. | 380/283 |
| 2003/0056099 A1* | 3/2003 | Asanoma et al. | 713/172 |
| 2004/0166931 A1* | 8/2004 | Criss-Puszkiewicz et al. | 463/29 |
| 2004/0170068 A1* | 9/2004 | Williams | 365/200 |

FOREIGN PATENT DOCUMENTS

| | | |
|---|---|---|
| JP | 2002-312326 | 10/2002 |
| JP | 2003-044798 | 2/2003 |
| JP | 2003-187357 | 7/2003 |
| JP | 2003-237485 | 8/2003 |

* cited by examiner

ELECTRONIC DEVICE, CONTROL METHOD THEREOF, SECURITY PROGRAM AND OTHERS

BACKGROUND OF THE INVENTION

1. Technical Field

This invention relates to a technical field for an apparatus or a method capable of preventing or suppressing the thief of an electronic device.

2. Background Art

Conventional electronic devices such as audio and navigation systems mounted on vehicles are equipped with various anti-theft mechanisms. In what is called the quick release system, for example, the user getting out of the vehicle can easily demount and take the device out of the vehicle with him/her. In the anti-theft system called the detach system, on the other hand, the user getting out of the vehicle can easily demount and take the panel (such as the operation/display panel) of the device. Patent Document 1 discloses the technique for the operation panel removable as an anti-theft mechanism.

In other anti-theft mechanisms now available, the device to be protected is activated by the user operating the operation/display panel and inputting the pass word to the device.

Patent Document 1: Japanese Unexamined Patent Publication No. 2003-237485

DISCLOSURE OF THE INVENTION

Problem to be Solved by the Invention

In the conventional anti-theft mechanism including the quick release and detach systems, however, the object to be brought out is so bulky inconveniently for the user. The mounting and demounting job is very bothersome.

In the anti-theft mechanism used by inputting the pass word into the system, on the other hand, the user is inconveniently required to input the pass word each time he/she enters the vehicle. Further, should the user forget the pass word, the system fails to start.

Accordingly, the object of this invention is to obviate these inconveniences and provide an electronic device, a control method and a security program capable of preventing or suppressing the theft of the electronic device more effectively.

Means for Solving the Problem

In order to solve the above problems, one aspect of the present invention relates to an electronic device comprising mounting means for loading a portable recording medium and encrypted information write means for encrypting predetermined information using an encryption key unique to the electronic device and writing the encrypted information in the recording medium, characterized by further comprising:

encrypted information read means for reading the encrypted information recorded in the recording medium in the case where the recording medium is loaded in the mounting means;

decryption execution means for executing the decryption of the encrypted information using the encryption key; and control means for setting the electronic device in usable mode in the case where the encrypted information is decrypted by the decryption execution means.

The electronic device is characterized by further comprising a volatile memory for holding the information, and load request means for determining whether the memory is in the information holding mode in the case where power is supplied to the electronic device with the recording medium not loaded in the mounting means, and in the case where the memory is not in the information holding mode, prompting the user to load the recording medium.

The electronic device is characterized in that the control means determines whether the information obtained by decrypting the encrypted information and the preset information coincide with each other, and in the case where they coincide with each other, sets the electronic device in usable mode.

The electronic device is characterized by further comprising alarm means for outputting an alarm in the case where the encrypted information is not decrypted by the decryption execution means.

In order to solve the above problems, another aspect of the present invention relates to a method of controlling an electronic device comprising mounting means for loading a portable recording medium and encrypted information write means for encrypting predetermined information using an encryption key unique to the electronic device and writing the encrypted information in the recording medium, characterized by comprising the steps of:

reading the encrypted information recorded in the recording medium in the case where the recording medium is loaded in the mounting means;

executing the decryption of the encrypted information using the encryption key; and setting the electronic device in usable mode in the case where the encrypted information is decrypted by the decryption execution means.

In order to solve the above problems, yet another aspect of the present invention relates to a security program characterized in that a computer included in an electronic device comprising mounting means for loading a portable recording medium and encrypted information write means for encrypting predetermined information using an encryption key unique to the electronic device and writing the encrypted information in the recording medium is caused to function in such a way that the encrypted information recorded in the recording medium is read in the case where the recording medium is loaded in the mounting means;

the decryption of the encrypted information is executed using the encryption key; and the electronic device is set in usable mode in the case where the encrypted information is decrypted by the decryption execution means.

In order to solve the above problems, still another aspect of the present invention relates to a recording medium characterized in that the security program is recorded in a computer readable form.

DESCRIPTION OF REFERENCE NUMERALS

1 On-vehicle audio system
11 Information reproducing unit
12 Information output unit
13 Display/operation unit
14 Memory card mounting unit
15 Memory card control unit
16 Nonvolatile memory
17 System control unit
18 Battery power supply
20 Memory card

DETAILED DESCRIPTION OF THE INVENTION

Best for Carrying Out the Invention

Most preferred embodiments of the invention are described below with reference to the accompanying drawings. The embodiments described below refer to an application of the invention to an on-vehicle audio system.

Figure 1:
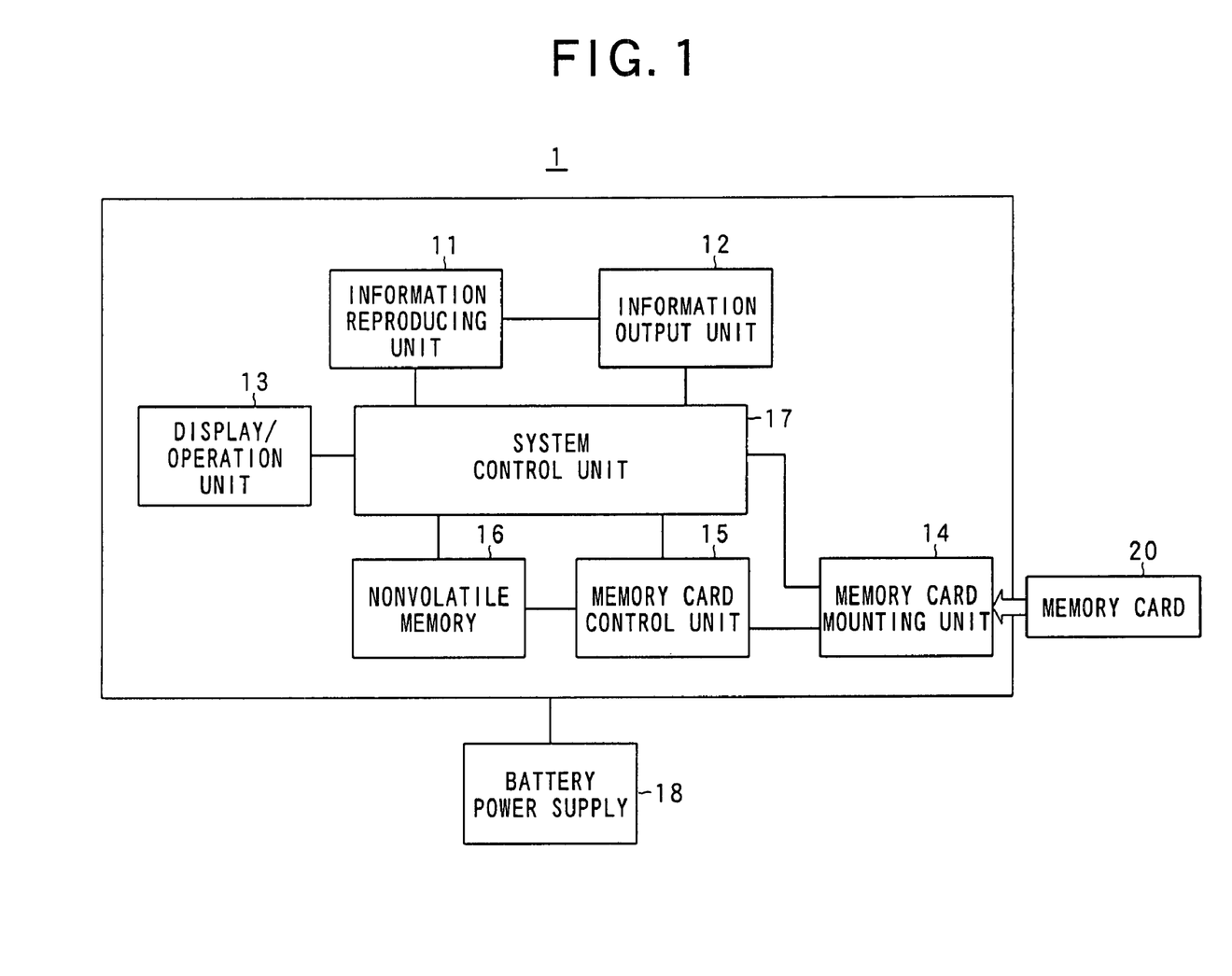
FIG. 1 is a diagram showing an example of blocks in general of an on-vehicle audio system according to this embodiment.

First, with reference to FIG. 1, the configuration and the functions of the on-vehicle audio system according to an embodiment are explained. FIG. 1 is a diagram showing blocks in general of the on-vehicle audio system according to this embodiment.

As shown in FIG. 1, the on-vehicle audio system 1 is configured of an information reproducing unit 11, an information output unit 12, a display/operation unit 13, a memory card mounting unit 14 as a mounting means, a memory card control unit 15 as an encrypted information write means, an encrypted information read means and a decryption execution means, a nonvolatile memory (such as an EEPROM) 16 and a system control unit 17 as a control means, a load request means and an alarm output means. The on-vehicle audio system 1 is supplied with power from an ACC power supply by the turning on of a battery power supply 18 or an ACC power supply switch.

The information reproducing unit 11, though not shown, is configured of a mechanism for loading an optical disk such as a CD (compact disk), an optical pickup for radiating a light beam on an optical disk placed at a predetermined clamp position, optically reading the recorded information (such as music data) and outputting an electrical signal by photoelectric conversion, a RF amplifier for producing and outputting a RF (radio frequency) signal from the electrical signal output from the optical pickup, a DSP (digital signal processor) for converting the RF signal into a digital signal by a predetermined demodulation process and an error correction process and a servo circuit for carrying out the servo control of the spindle motor and the optical pickup. Under the control of the system control unit 17, the recorded information recorded in the optical disk is reproduced as digital audio signal and output to the information output unit 12. The information reproducing unit 11 is not specifically limited to the reproduction of the recorded information recorded in a CD, but may reproduce the recorded information recorded in a MD (minidisk) or DVD (digital versatile disk).

The information output unit 12, though not shown, includes a DAC (digital-to-analog converter) which is supplied with the digital audio signal output from the information reproducing unit 11 and converts it into an analog audio signal, an AMP (amplifier) for amplifying and outputting the analog audio signal and a speaker for outputting the amplified analog audio signal as a sound wave.

The display/operation unit 13 has a plurality of operation buttons for receiving various instructions (for such as music reproduction and display of various information) from the user. In the case where the user depresses an operation button, an instruction signal corresponding to the particular operation button is output to the system control unit 17. The display/operation unit 13 has a display panel such as a liquid crystal panel to display various information and a selection menu under the control of the system control unit 17.

Though explained in detail later, the display/operation unit 13 displays the key management menu on the display panel under the control of the system control unit 17 based on the key management menu display instruction from the user. By operating the operation buttons in the key management menu, the user thus can issue/recover the encryption key and set the security on/off state by the encryption key and the validity/invalidity of the encryption key.

A memory card (well known Magic Gate Memory Stick (registered trade mark) in this embodiment) 20 as an example of the portable recording medium is inserted and loaded into the memory card mounting unit 14. The memory card mounting unit 14 has a detector for electrically or mechanically detecting the loaded condition of the memory card 20, and upon detection that the memory card 20 is loaded, outputs the detection signal to the memory card control unit 15 and the system control unit 17.

The memory card 20, though not shown, includes an encryption calculation circuit configured of, for example, a LSI (large scale integrated circuit), and a flash memory for recording the information. Further, the memory card 20 includes a nonvolatile memory for storing and holding the medium identification information (ID) and the encryption key unique to a particular card (different from one card to another). This medium identification information is assigned to the memory card 20 and stored in the nonvolatile memory at the time of production or shipment of the memory card 20.

The memory card control unit 15, though not shown, also includes an encryption calculation circuit configured of a LSI (large scale integrated circuit), for example. The nonvolatile memory 16 has stored and held therein the device identification information (ID) unique to the on-vehicle audio system 1 (different for each on-vehicle audio system). This device identification information is assigned to the particular system 1 and stored in the nonvolatile memory 16 at the time of production or shipment, for example, of the on-vehicle audio system 1.

In the case where the memory card 20 is loaded in the memory card mounting unit 14 (in the case where a detection signal is received from the memory card mounting unit 15), the mutual identification information (the device identification information (ID) and the medium identification information (ID)) are exchanged between the memory card control unit 15 and the memory card 20 through a communication path between the memory control unit 15 and the memory card 20 thereby to authenticate the legitimacy (in keeping with copyright protection) of the device or the medium (mutual authentication).

In the case where the result of the authentication described above is normal, the subsequent information exchange is carried out after encryption. For this encryption, three keys are used, including a device encryption key used only by the encryption calculation circuit of the memory card control unit 15, a card encryption key used only by the encryption calculation circuit of the memory card 20 and a common encryption key used by the memory card control unit 15 and the encryption calculation circuit of the memory card 20. Among these keys, the device encryption key is unique to the on-vehicle audio system 1, generated based on the device identification information, for example, and stored and held in advance in the nonvolatile memory 16. The card encryption key, on the other hand, is unique to the memory card 20, generated based on the medium identification information and stored and held in advance in the nonvolatile memory of the memory card 20.

The common encryption key is shared by the on-vehicle audio system 1 and the memory card 20 and generated in both the memory card control unit 15 and the memory card 20 each time of mutual authentication. More specifically, the memory card control unit 15 and the encryption calculation circuit of the memory card 20 generate a common encryption key based on the device identification information and the medium identification information obtained by the mutual authentication. The well known various methods can be used for generation of the common encryption key. As an example, the encryption calculation circuit connects the number of several digits constituting the medium identification information and the number of several digits constituting the device identification information and based on the resultant number, generates the common encryption key by the calculation method using the hash function, for example (a pseudo random number of a fixed length is generated from a given number and used as a common encryption key).

The common encryption key generated in this way constitutes a common encryption key unique to the combination of the on-vehicle audio system 1 and the memory card 20. As an alternative, the common encryption key may be generated based only on the medium identification information.

Figure 2:
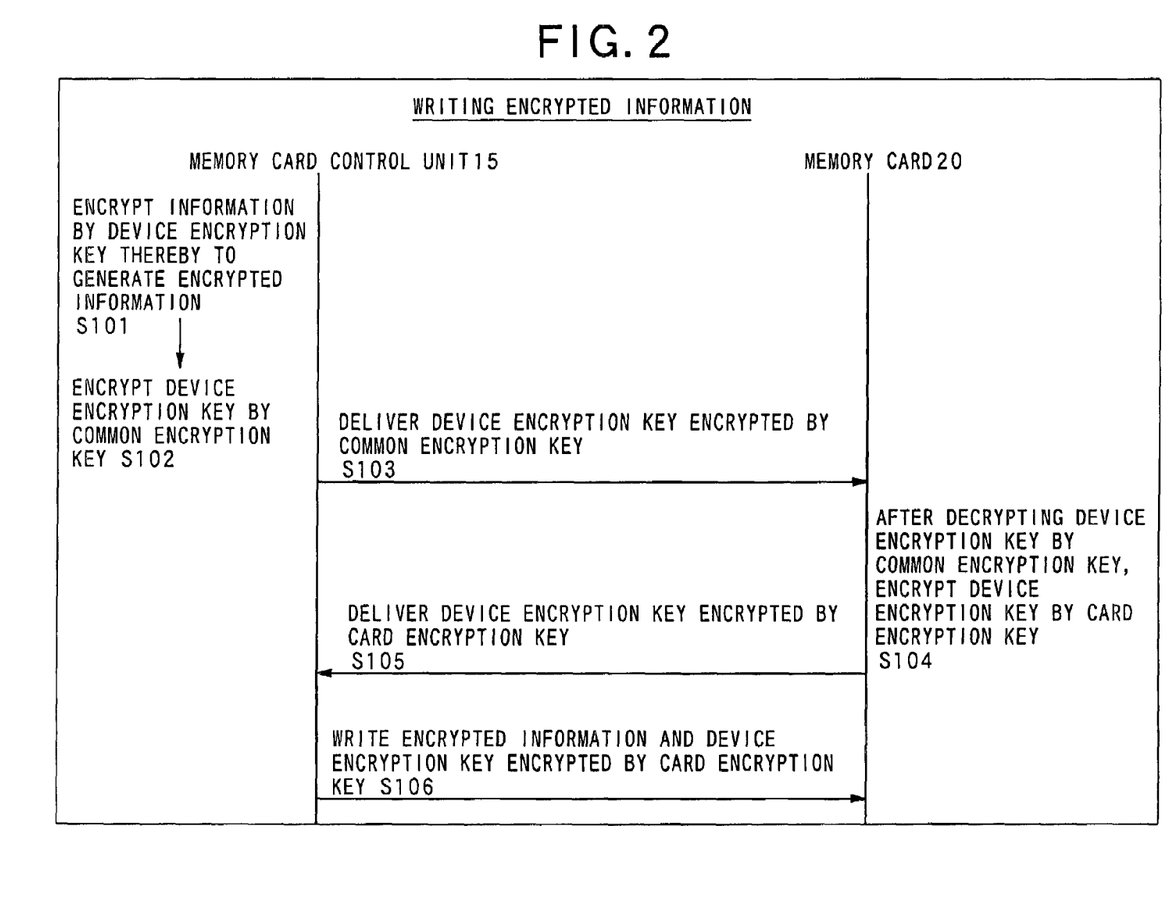
FIG. 2 is a sequence diagram showing the information processing by and the information exchange between a memory card control unit 15 and a memory card 20 for writing the encrypted information in the memory card 20.

The information exchange between the memory card control unit 15 and the memory card 20 using these encryption keys is explained with reference to FIGS. 2 and 3. FIG. 2 is a sequence diagram showing the information processing by and the information exchange between the memory card control unit 15 and the memory card 20 at the time of writing the encrypted information in the memory card 20, and FIG. 3 a sequence diagram showing the information processing by and the information exchange between the memory card control unit 15 and the memory card 20 at the time of reading the encrypted information from the memory card 20.

First, at the time of writing the encrypted information in the memory card 20, as shown in FIG. 2, the encryption calculation circuit of the memory card control unit 15 encrypts the information (such as a pass word) designated by the system control unit 17, for example, using the device encryption key and thus generates the encrypted information (step S101). Then, the encryption calculation circuit of the memory card control unit 15 encrypts the device encryption key using the common encryption key (step S102), and delivers it to the encryption calculation circuit of the memory card 20 (step S103).

Accordingly, the encryption calculation circuit of the memory card 20, after decrypting the device encryption key using the common encryption key, encrypts the device encryption key using the card encryption key (step S104) and delivers it to the encryption calculation circuit of the memory card control unit 15 (step S105).

Accordingly, the encryption calculation circuit of the memory card control unit 15 writes in the flash memory of the memory card 20 the encrypted information encrypted as described above and the device encryption key encrypted by the card encryption key from the encryption calculation circuit of the memory card 20 (step S106).

Figure 3:
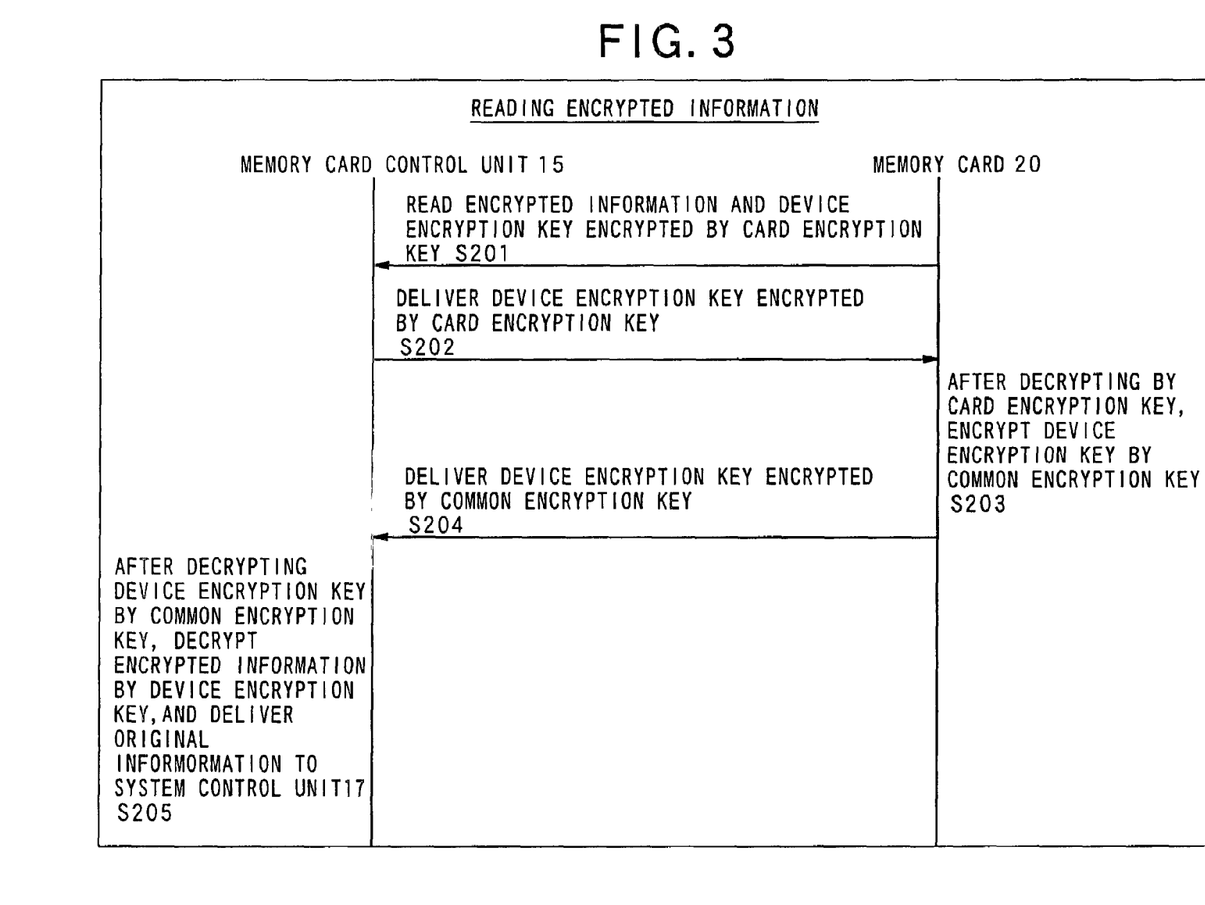
FIG. 3 is a sequence diagram showing the information processing by and the information exchange between the memory card control unit 15 and the memory card 20 for reading the encrypted information from the memory card 20.

Next, at the time of reading the encrypted information from the memory card 20, as shown in FIG. 3, the encryption calculation circuit of the memory card control unit 15, under the instruction of the system control unit 17, reads the encrypted information written in the flash memory and the device encryption key encrypted by the card encryption key (step S201). In the process, the encryption calculation circuit of the memory card control unit 15 checks to see whether the encrypted information is illegally copied or not. Then, the encryption calculation circuit of the memory card control unit 15 delivers the device encryption key encrypted by the card encryption key to the encryption calculation circuit of the memory card 20 (step S202).

Accordingly, the encryption calculation circuit of the memory card 20 decrypts the device encryption key using the card encryption key, encrypts the device encryption key using the common encryption key (step S203), and delivers it to the encryption calculation circuit of the memory card control unit 15 (step S204).

Accordingly, the encryption calculation circuit of the memory card control unit 15 decrypts the device encryption key using the common encryption key, decrypts (decodes) the encrypted information using the particular device encryption key, and obtaining the original information, delivers it to the system control unit 17 (step S205).

In this way, a security system is configured of the on-vehicle audio system 1 and the memory card 20.

The system control unit 17 includes a CPU having the arithmetic function, a RAM as a volatile memory and a ROM for storing the various processing programs (which may be downloaded from a predetermined server on an internet or recorded in a recording medium such as a flexible disk (CD-ROM, for example) and may be read through the drive of the recording medium) and the data. The RAM in the system control unit 17 holds the information as long as power is supplied from the battery power supply 18.

Upon execution by the CPU of the program stored in the ROM, the system control unit 17 as a computer controls the on-vehicle audio system 1 as a whole overall, and in response to the user designation through the operation buttons of the display/operation unit 13, reproduces the recorded information from the optical disk, displays the various information on the display panel or otherwise implements the functions of the on-vehicle audio system 1.

Further, in the case where power is supplied to the on-vehicle audio system 1 with the memory card 20 not loaded in the memory card mounting unit 14, the system control unit 17 determines whether the RAM holds the information or not, and in the case where no information is held therein, prompts the user to load the memory card 20 in the memory card mounting unit 14. Then, assume that the memory card 20 is loaded in the memory card mounting unit 14, that the encrypted information is read by the memory card control unit 15 and that the decrypted (decoded) information is input to the system control unit 17. The system control unit 17 determines whether the information acquired by decrypting the encrypted information and the preset information coincide with each other or not, and if they coincide with each other, sets the on-vehicle audio system 1 in usable mode.

The usable mode is defined as a state in which the function of the on-vehicle audio system 1 can be normally activated and exhibited. In such a state, for example, the on-vehicle audio system 1 accepts the instruction through the operation buttons from the user and can reproduce the recorded information from the optical disk loaded in the information reproducing unit 11. The unusable mode, on the contrary, is a state in which the function of the on-vehicle audio system 1 is not normally activated and stopped or forcibly locked, and not accepting the instruction through the operation buttons from the user, the recorded information cannot be reproduced from the optical disk loaded in the information reproducing unit 11.

The system control unit 17 may be so configured that in the case where the encrypted information is decrypted by the memory card control unit 15, the particular information is received and the on-vehicle audio system 1 is set in usable mode.

The system control unit 17 causes the key management menu to be displayed on the display panel of the display/operation unit 13, and based on the instruction from the user through the operation buttons, issues/recovers the encryption key, sets the security on/off state with the encryption key, and sets the encryption key as valid/invalid. The contents set by the key management menu are stored in the nonvolatile memory 16.

The wording "the encryption key is issued" indicates that as shown in step S106 of FIG. 2, for example, the device encryption key encrypted by the card encryption key is written in the flash memory of the memory card 20 together with the encrypted information, and the wording "the encryption key is recovered" means that the encrypted device encryption key and the encrypted information written in the flash memory of the memory card 20 are erased. The wording "the encryption key is set as invalid" indicates that the encrypted device encryption key written in the flash memory of the memory card 20 is set in unusable mode.

Figure 4:
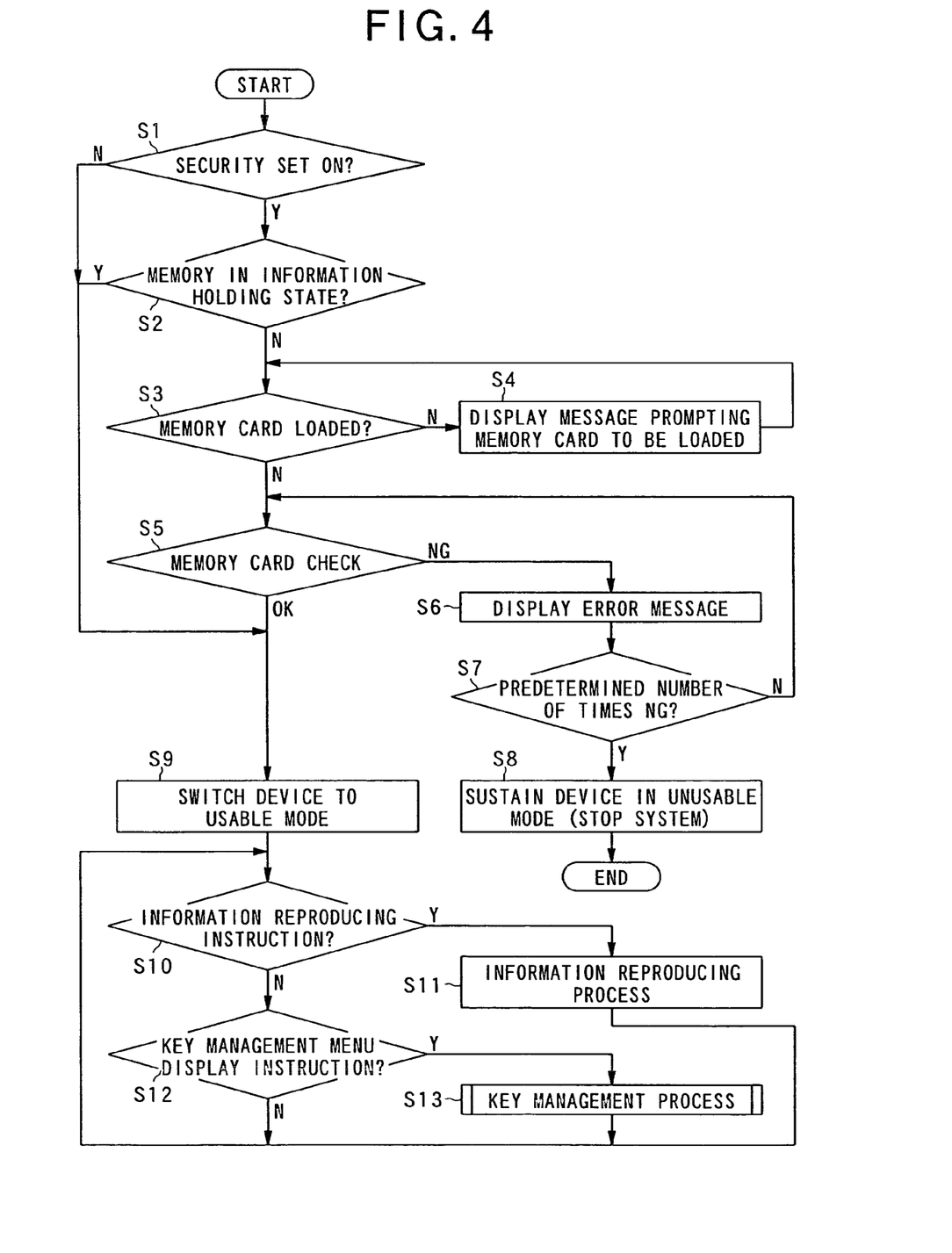
FIG. 4 is a flowchart showing an example of the main routine in the system control unit 17.
Figure 5:
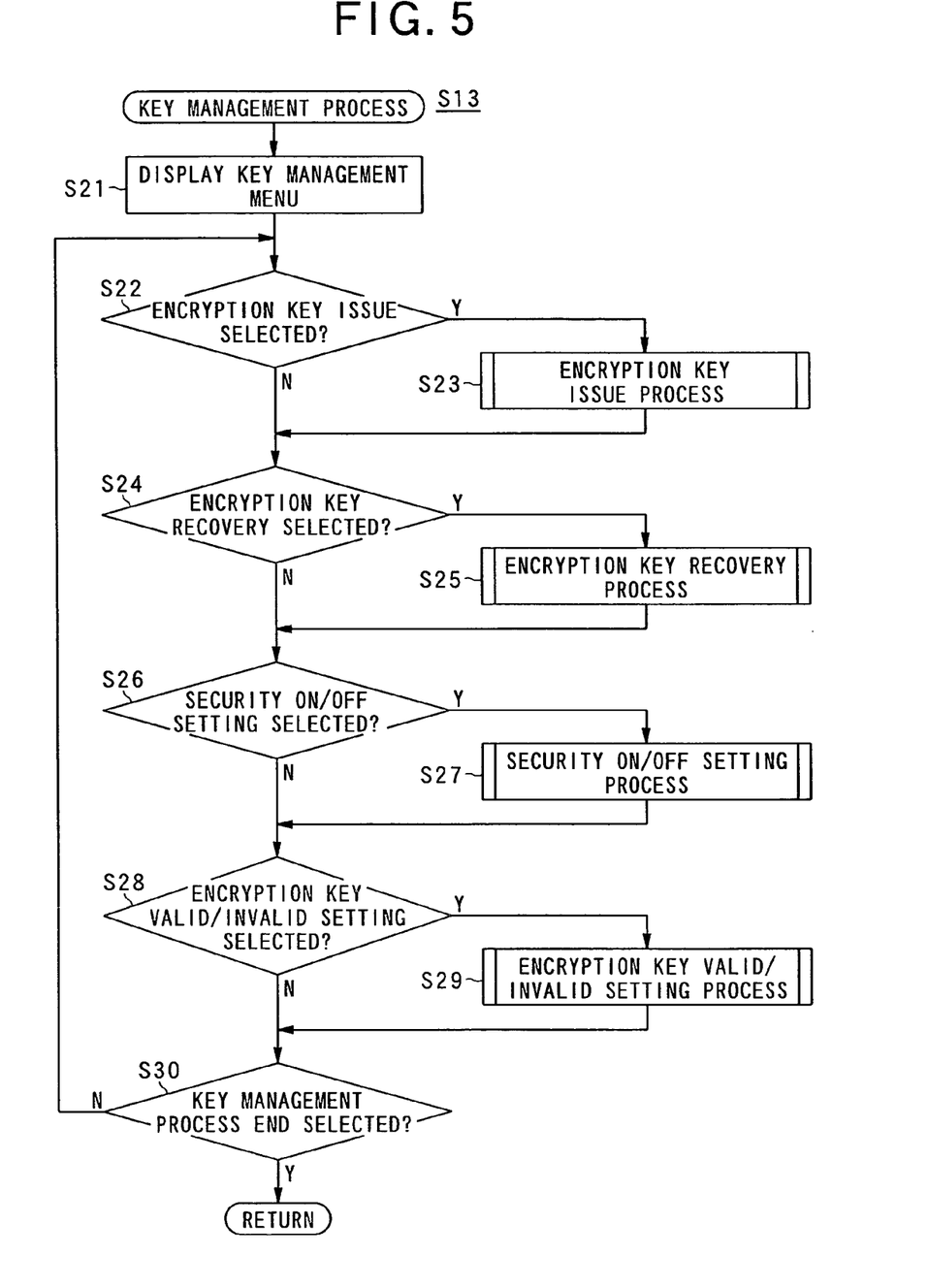
FIG. 5 is a flowchart showing the detail of the key management process in step S13 shown in FIG. 4.

Next, with reference to FIGS. 4 to 6, the operation of the on-vehicle audio system 1 according to this embodiment is explained.

Figure 6A:
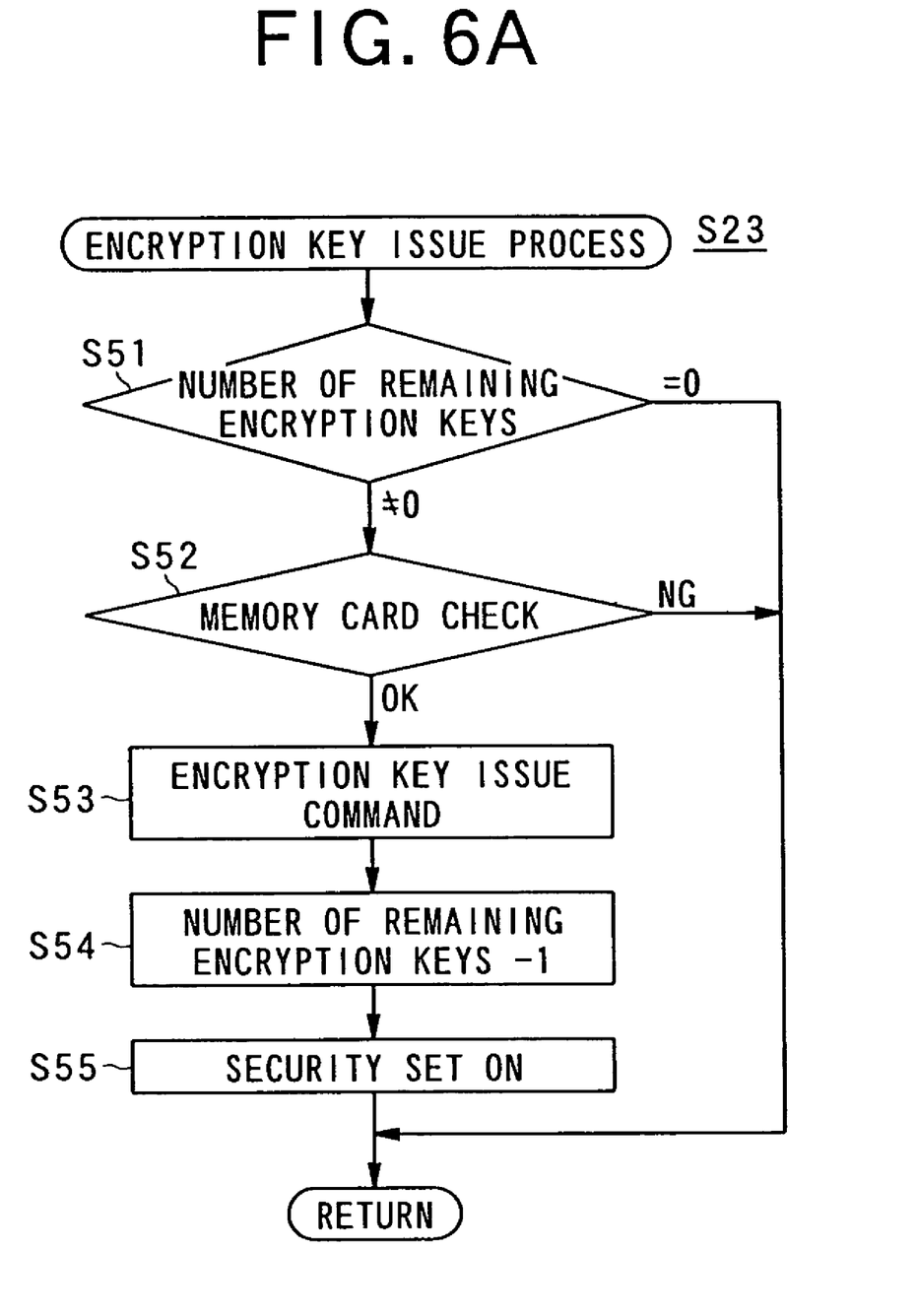
FIG. 6A is a flowchart showing the process of issuing an encryption key in step S23 shown in FIG. 5.
Figure 6B:
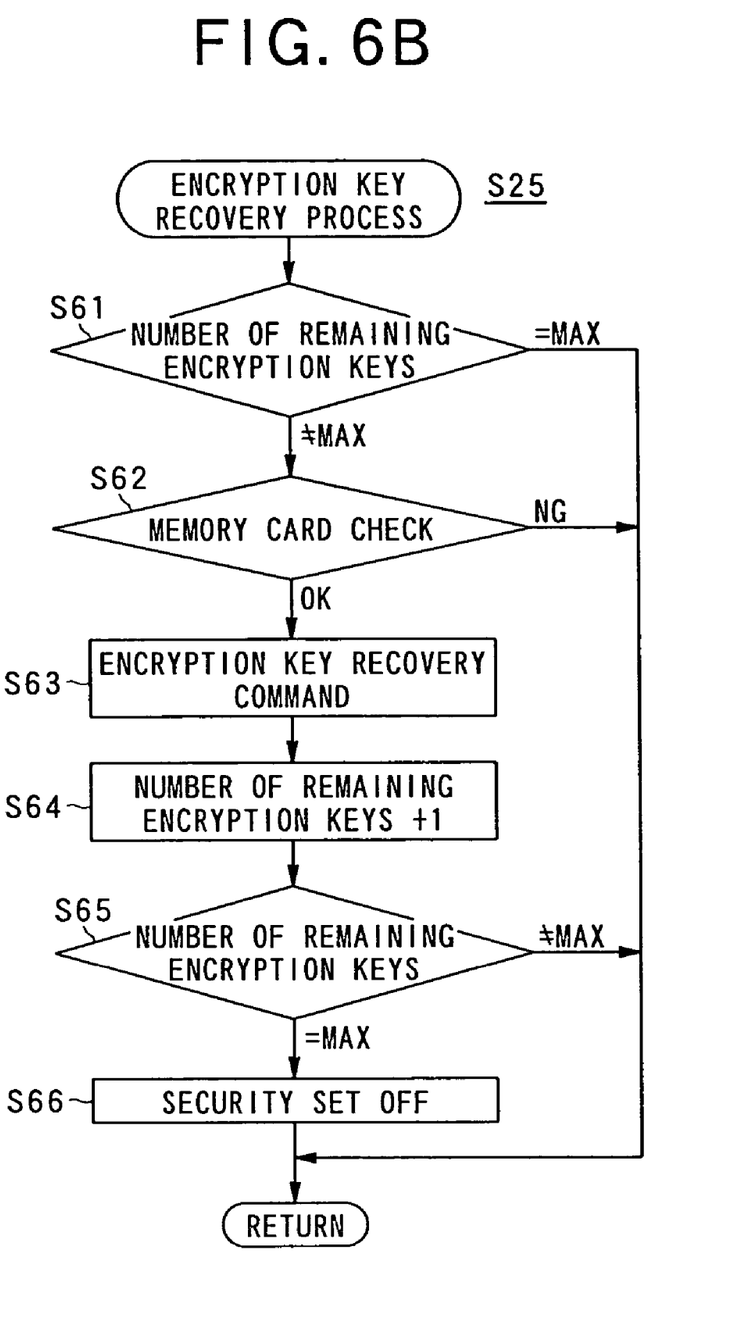
FIG. 6B is a flowchart showing the process of recovering an encryption key in step S25 shown in FIG. 5.
Figure 6C:
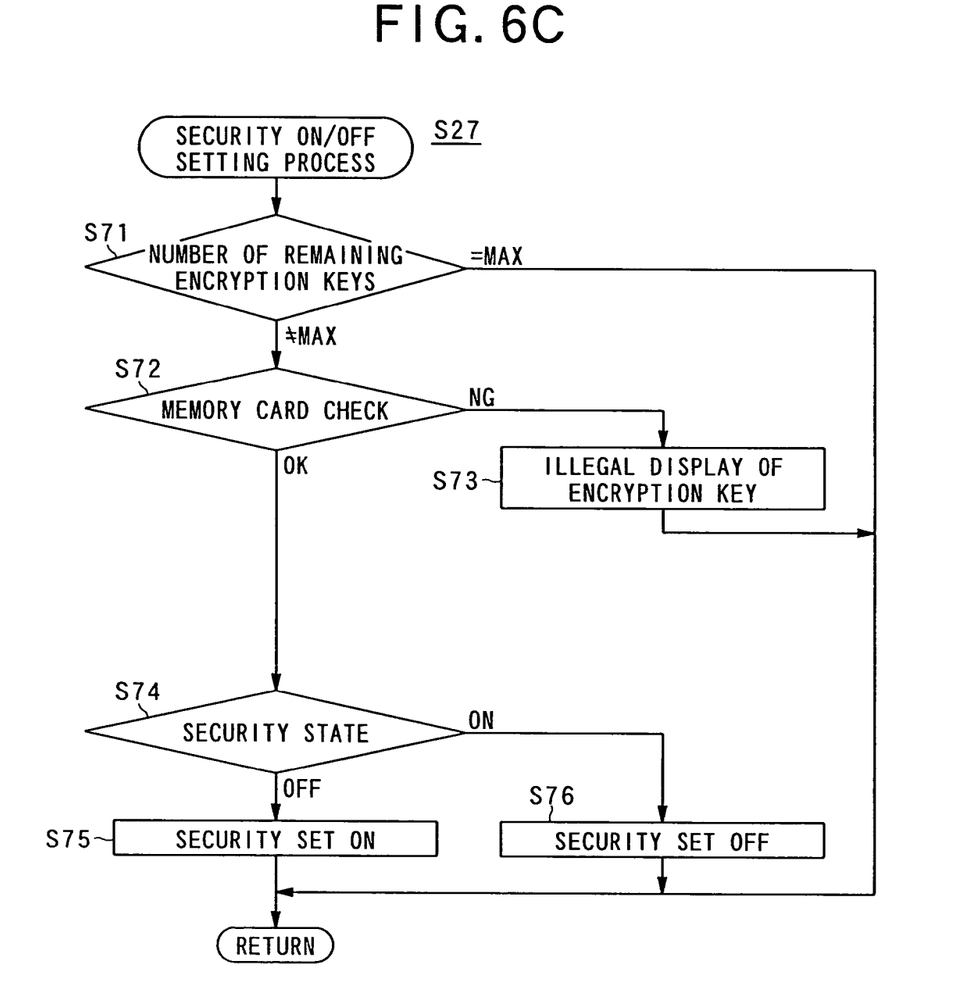
FIG. 6C is a flowchart showing the security on/off setting process in step S27 shown in FIG. 5.
Figure 6D:
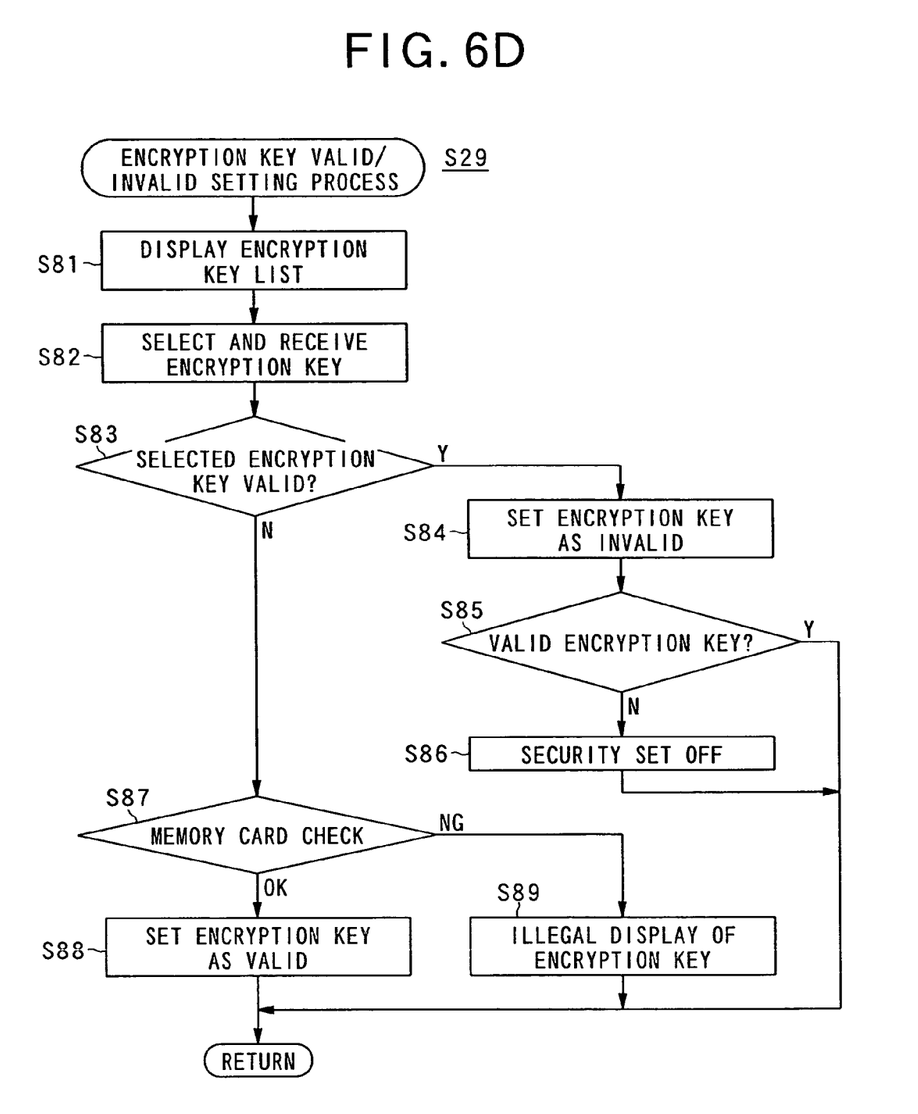
FIG. 6D is a flowchart showing the encryption key valid/invalid setting process in step S29 shown in FIG. 5.

FIG. 4 is a flowchart showing an example of the main routine for the system control unit 17. FIG. 5 is a flowchart showing the detail of the key management process in step S13 shown in FIG. 4. FIG. 6A is a flowchart showing the process of issuing an encrypted key in step S23 in FIG. 5. FIG. 6B is a flowchart showing the process of recovering an encrypted key in step S25 in FIG. 5. FIG. 6C is a flowchart showing the security on/off setting process in step S27 in FIG. 5. FIG. 6D is a flowchart showing the encrypted key valid/invalid setting process in step S29 in FIG. 5.

First, with the on-vehicle audio system 1 switched on, power is supplied from the battery power supply 18 and the audio system 1 is activated. In this initial stage of operation, the system is in unusable mode. In the process shown in FIG. 4, therefore, the system control unit 17 accesses the nonvolatile memory 16, for example, and determines whether security is set on, i.e. whether security can be implemented by the encryption key or not (step S1). In the case where security is set on (Y in step S1), the process proceeds to step S2, while in the case where security is not set on (security is set off) (N in step S2), on the other hand, the process proceeds to step S9.

Step S2 determines whether the RAM constituting a volatile memory is in the information holding state (whether the process is started from the memory holding mode) and in the case where it is not in the information holding state (for example, the system 1 is removed, power from the battery power supply is cut off (backup power supply cut off) and the information in the RAM is erased) (N in step S2), the process proceeds to step S3, while in the case where the information holding state prevails (Y in step S2), on the other hand, the process proceeds to step S9.

Step S3 determines whether the memory card 20 is loaded in the memory card mounting unit 15, and in the case where the memory card 20 is not so loaded (N in step S3), the process proceeds to step S4, while in the case where the memory card 20 is so loaded (the detection signal output from the memory card mounting unit 15) (Y in step S3), on the other hand, the process proceeds to step S5.

In step S4, the message for prompting the memory card 20 to be loaded, such as the words "Load the memory card", is displayed on the display panel of the display/operation unit 13. The system control unit 17 may alternatively be configured to prompt the memory card 20 to be loaded by aurally outputting the message from the speaker of the information output unit 12.

In step S5, the memory card check is conducted to determine whether the memory card 20 is a legitimate medium or not.

In the memory card check in step S5, the system control unit 17 issues a memory card check command to the memory card control unit 15, for example, so that as described above, the mutual identification information (the device identification information and the medium identification information) are exchanged between the memory card control unit 15 and the memory card 20 through a communication path thereby to carry out the mutual authentication described above.

In the case where the result of the mutual authentication is satisfactory, the memory card control unit 15 and the encryption calculation circuit of the memory card 20 generate a common encryption key based on the device identification information and the medium identification information obtained by the mutual authentication.

Then, the memory control unit 15 confirms whether the encrypted information and the encrypted device encryption key are written in the memory card 20, and in the case where the information are so written, the information processing and the information exchange in steps S201 to S205 shown in FIG. 3 and described above are carried out.

The system control unit 17 determines whether the information decrypted from the memory card control unit 15 and the information preset by the user, etc. and stored in the nonvolatile memory 15, for example, coincide with each other or not. In the case where they coincide with each other, the memory card check is determined as satisfactory (OK in step S5), and the process proceeds to step S9.

In the case where the authentication result in the memory card check is not satisfactory, i.e. in the case where the memory card is an ordinary one failing to meet the copyright protection requirements, for example, on the other hand, it is determined that the memory card check is not satisfactory (NG in step S5), and the message indicating the fact is displayed on the display panel of the display/operation unit 13 (step S6). Assume, for example, that the encrypted information is not written in the memory card 20, that the encryption key is set as invalid or that the encrypted information cannot be decrypted by the encryption key (the encryption key is illegal). Then, it is determined that the memory card check is not satisfactory, and the message indicating the fact is displayed on the display panel of the display/operation unit 13. In the case where the number of times the memory card check is determined as not satisfactory fails to coincide with a predetermined number (fails to reach the predetermined number) (N in step S7), the process returns to step S5 where the memory card check is carried out again.

In the case where the number of times the memory card check is determined as not satisfactory coincides with a predetermined number (reaches the predetermined number) (Y in step S7), on the other hand, the unusable mode of the on-vehicle audio system 1 is sustained (step S8), and an alarm (such as a large siren sound or a message to the effect that the system is a stolen good) is output from the speaker of the information reproducing unit 11. The power from the battery power supply 18 to the on-vehicle audio system 1 may be cut off.

In step S9, the system control unit 17 switches the on-vehicle audio system 1 to the usable mode, so that the function of the on-vehicle audio system 1 is normally activated. As a result, the system control unit 17, upon receipt of the information reproduction command through the operation buttons of the display/operation unit 13 from the user (Y in step S10), controls the information reproducing unit 11 thereby to reproduce the recorded information from the optical disk (step S11). In addition, though not shown, predetermined functions such as panel display are executed in response to the instructions through the operation buttons of the display/operation unit 13 from the user.

The system control unit 17, upon receipt of the key management menu display instruction from the user through the operation buttons on the display/operation unit 13 (Y in step S12), proceeds to the key management process shown in FIG. 5 (step S13).

In the key management process shown in FIG. 5, the key management menu is first displayed on the display panel of the display/operation unit 13 (step S21). Select items including "issue encryption key", "recover encryption key", "set security on/off", "set encryption key as valid/invalid" and "end key management menu" are displayed on the key management menu.

The system control unit 17, upon receipt of the select instruction "issue encryption key" from the user through the operation buttons of the display/operation unit 13 (Y in step S22), proceeds to the encryption key issue process shown in FIG. 6A (step S23).

The system control unit 17, upon receipt of the select instruction "recover encryption key" from the user through the operation buttons of the display/operation unit 13 (Y in step S24), on the other hand, proceeds to the encryption key recovery process (step S25).

The system control unit 17, upon receipt of the select instruction "set security on/off" from the user through the operation buttons of the display/operation unit 13 (Y in step S26), on the other hand, proceeds to the security on/off setting process (step S27).

The system control unit 17, upon receipt of the select instruction "set encryption key as valid/invalid" from the user through the operation buttons of the display/operation unit 13 (Y in step S28), on the other hand, proceeds to the encryption key valid/invalid setting process (step S29).

The system control unit 17, upon receipt of the select instruction "end key management menu" from the user through the operation buttons of the display/operation unit 13 (Y in step S30), returns to the process shown in FIG. 4.

Next, the encryption key issue process shown in FIG. 6A is explained.

In the encryption key issue process shown in FIG. 6A, the system control unit 17 accesses the nonvolatile memory 14, for example, and determines whether the number of the remaining encryption keys (the maximum issuable number of the encryption keys (say, 4) less the present number of the encryption keys (say, 2) is 0 or not (step S51).

The number of the encryption keys that can be issued by the audio system 1 is limited by the maximum issuable number of encryption keys thereby to strengthen the security, while at the same time being adapted for plural issues (in other words, the encrypted device encryption key and the encrypted information are written in a plurality of memory cards) to provide for the shared use by family members and loss. This maximum issuable number of encryption keys may be set arbitrarily by the user, for example, through the operation buttons on the display/operation unit 13 or may be set in advance by the maker.

In the case where the number of the remaining encryption keys is 0 (0 in step S51), the encryption keys cannot be issued any more, and the message indicating the fact is displayed on the display panel, after which the encryption key issue process is ended and the process returns to FIG. 5. In the case where the number of the remaining encryption keys is not 0 (NOT 0 in step S51), on the other hand, the memory card check is carried out (step S52). In the case where the memory card 20 is not loaded in the memory card mounting unit 14, a message prompting the memory card 20 to be loaded is displayed on the display panel of the display/operation unit 13, so that in the case where the memory card 20 is loaded by the user, the memory card check is carried out.

In the memory card check process in step S52, the system control unit 17 issues a memory card check command to the memory card control unit 15. Then, as described above, the mutual identification information (the device identification information and the medium identification information) are exchanged between the memory card control unit 15 and the memory card 20 through a communication path to conduct the mutual authentication described above. In the case where the authentication result is satisfactory, the memory card check is satisfactory (OK in step S52), the process proceeds to step S53. In the case where the authentication result is satisfactory, the memory card control unit 15 and the encryption calculation circuit of the memory card 20 generate a common encryption key based on the device identification information and the medium identification information obtained by the mutual authentication.

In the case where the authentication result is not satisfactory or, for example, in the case where the memory card is an ordinary one failing to meet the copyright protection requirements, on the other hand, the memory card check is determined not satisfactory (NG in step S52), and the message indicating the fact is displayed on the display panel, after which the encryption key issue process is ended and the process returns to FIG. 5.

In step S53, the system control unit 17 designates the preset information (such as the password input by the user operation of the operation buttons on the display/operation unit 13) and gives an encryption key issue command to the memory card control unit 15. As a result, the information processing and the information exchange in steps S101 to S106 shown in FIG. 2 are carried out so that the device encryption key encrypted by the card encryption key is written in the flash memory of the memory card 20 together with the encrypted information.

In this way, a new memory card 20 for security of the on-vehicle audio system 1 is issued, i.e. the memory card 20 itself is generated as a key. The maximum number of the keys of the memory card 20 issued in this way is the same as the maximum issuable number of encryption keys.

Next, the number of the remaining encryption keys stored in the nonvolatile memory 14 is reduced by one (step S54) and security is set on (step S55). The information indicating the encryption key written in the memory card 20 (such as the identification information corresponding to the encryption key) is set in correspondence with the device identification information and the medium identification information and registered in the encryption key list stored in the nonvolatile memory 14, for example.

Next, the encryption key recovery process shown in FIG. 6B is explained.

In the encryption key recovery process shown in FIG. 6B, the system control unit 17 accesses the nonvolatile memory 14, for example, and determines whether the number of the remaining encryption keys is "maximum" or not (step S61). In the case where the number of the remaining encryption keys is "maximum" (MAX in step S61), no encryption key is issued at all. Thus, the message indicating the fact is displayed on the display panel, after which the encryption key recovery process is ended and the process returns to FIG. 5. In the case where the number of the remaining encryption keys is not "maximum" (NOT MAX in step S61), on the other hand, the memory card check is carried out (step S62). The memory card check is similar to the version in step S52 described above and therefore not explained again. In the case where the mutual authentication is satisfactory, the system control unit 17 accesses the encryption key list stored in the nonvolatile memory 16, for example. The system control unit 17 thus determines whether the information indicating the encryption key corresponding to the device identification information and the medium identification information is registered or not, and in the case where the information is so registered, gives an encryption key recovery command to the memory card control unit 15. As a result, the memory card control unit 15 erases the device encryption key and the encrypted information written in the flash memory of the memory card 20.

Then, the number of the remaining encryption keys stored in the nonvolatile memory 14 is increased by one (step S64), while at the same time erasing the information indicating the encryption key corresponding to the device identification information and the medium identification information registered in the encryption key list stored in the nonvolatile memory 16, for example.

Next, it is determined whether the number of the remaining encryption keys is "maximum" or not (step S65). In the case where the number of the remaining encryption keys is "maximum" (MAX in step S65), security is set off (step S66), the encryption key issue process is ended and the process returns to FIG. 5. In the case where the number of the remaining encryption keys is not "maximum" (NOT MAX in step S65), on the other hand, the encryption key issue process is ended as it is and the process returns to FIG. 5.

Next, the security on/off setting process shown in FIG. 6C is explained.

In the security on/off setting process shown in FIG. 6C, the system control unit 17 accesses the nonvolatile memory 14, for example, and determines whether the number of the remaining encryption keys is "maximum" or not (step S71). In the case where the number of the remaining encryption keys is "maximum" (MAX in step S71), no encryption key is issued at all, and the message indicating the fact is displayed on the display panel, after which the security on/off setting process is ended and the process returns to FIG. 5.

In the case where the number of the remaining encryption keys is not "maximum" (NOT MAX in step S71), on the other hand, the memory card check is carried out (step S72). In this memory card check, in addition to the memory card check in step S52, the memory card control unit 15 further checks to see whether the device encryption key written in the memory cad 20 is a legitimate key or not.

In the case where the mutual authentication is satisfactory, for example, the encryption calculation circuit of the memory card control unit 15 reads the encrypted device encryption key written in the memory card 20 and delivers it to the encryption calculation circuit of the memory card 20. In response, the encryption calculation circuit of the memory card 20 decrypts the device encryption key using the card encryption key, after which the device encryption key is encrypted using the common encryption key and delivered to the encryption calculation circuit of the memory card control unit 15. In response, the encryption calculation circuit of the memory card control unit 15 decrypts the device encryption key using the common encryption key and determines whether the particular device encryption key is the one for the on-vehicle audio system 1 or not, and the determination result is transmitted to the system control unit 17.

In the case where the particular device encryption key is not the one for the on-vehicle audio system 1, it is determined that the memory card check is not satisfactory (NG in step S72), and the message indicating that the encryption key is illegal and therefore the security setting cannot be changed is displayed on the display panel (step S73), after which the security on/off setting process is ended and the process returns to FIG. 5.

in the case where the particular device encryption key is the one for the on-vehicle audio system 1, on the other hand, it is determined that the memory card check is satisfactory (OK in step S72). Then, the present security setting is determined (step S74). In the case where security is set off (OFF in step S74), security is set on (step S75), while in the case where security is set on (ON in step S74), security is set on (step S76) and the security on/off setting process is ended. Then, the process returns to FIG. 5.

Next, the encryption key valid/invalid setting process shown in FIG. 6D is explained.

In the encryption key valid/invalid setting process shown in FIG. 6D, the system control unit 17 reads the encryption key list stored in the nonvolatile memory 16 and displays it selectably on the display panel (step S81). This encryption key list contains, in list form, the information indicating the encryption key issued by the encryption key issue process shown in FIG. 6A.

The user selects the information indicating the desired encryption key displayed in the encryption key list through the operation buttons of the display/operation unit 13. Then, the information indicating the selected encryption key is received by the system control unit 17 (step S82), and it is determined whether the particular encryption key is valid or not (step S83).

In the case where the encryption key is valid (Y in step S83), the encryption key is set as invalid (step S84), followed by determining whether there is any valid encryption key or not (step S85). In the case where there exists a valid key (Y in step S85), the encryption key valid/invalid setting process is ended and the process returns to FIG. 5. In the case where there is no valid encryption key (N in step S85), on the other hand, security is set off (step S86) and the process returns to FIG. 5.

In the case where the encryption key is determined as not valid (invalid) in the process of step S83 (N in step S83), on the other hand, the memory card check is executed (step S87). This memory card check is similar to the one in step S72 described above and therefore not explained again.

In the case where the memory card check is satisfactory (OK in step S87), the selected encryption key is set as valid (step S88), while in the case where the memory card check is not satisfactory (NG in step S87), the message indicating that the encryption key is illegal and cannot be set as valid is displayed on the display panel (step S89), after which the encryption key valid/invalid setting process is ended and the process returns to FIG. 5.

As explained above, according to this embodiment, assume that the on-vehicle audio system 1 is stolen while security is set on. Without the memory card 20 in which the encrypted information and the encryption key (the device encryption key encrypted by the card encryption key) issued by the memory card control unit 15 of the particular on-vehicle audio system 1 are written, the on-vehicle audio system 1 cannot be activated normally and an alarm is issued from the speaker. Thus, the theft of the on-vehicle audio system 1 can be more effectively prevented or suppressed.

The memory card 20, which is compact and lightweight and therefore conveniently portable, can be said to be very convenient as a key to activate the on-vehicle audio system 1.

Assume that the encryption key (the device encryption key encrypted by the card encryption key) and the encrypted information written in the flash memory of the memory card 20 are illegally copied as a file to another memory card 20. In view of the fact that the card encryption key in the memory card 20 is unique (different from the card encryption key of other memory cards 20), however, the device encryption key cannot be extracted, and therefore the encrypted information cannot be decrypted. Thus, the on-vehicle audio system 1 not normally activated.

Furthermore, just in case the user loses or finds (after the loss) the memory card 20 in which the encryption key issued by the memory card control unit 15 and the encrypted information are written, the issued encryption key can be set as invalid or valid.

In the aforementioned embodiments, the on-vehicle audio system 1 may include a communication unit capable of communication with a radio base station, so that the on-vehicle audio system 1 can be connected to a server such as a security center through a radio base station and a mobile unit communication network or an internet. In the case where the number of times the memory card check is not satisfactory in step S7 shown in FIG. 4 is a predetermined number, the on-vehicle audio system 1 is connected to the server such as the security center to notify that the system 1 is stolen. Further, the on-vehicle audio system 1 may be equipped with a GPS receiver to notify the theft and the positional information (latitude and longitude) of the system 1. This configuration can prevent or suppress the theft of the on-vehicle audio system 1 more effectively, and even if stolen, the place where the system is located can be grasped.

The embodiments described above are so configured that in the case where security is set on and the information is not held, the memory card 20, if not loaded, is prompted to be loaded. As another example, the memory card 20, if not loaded, may be prompted to be loaded each time the ACC power supply switch is turned on (each time power is supplied from the ACC power supply).

Although the aforementioned embodiments employ a Magic Gate Memory Stick (registered trade mark) as an example of the memory card 20, the invention is not limited to such a memory card but applicable to any recording medium such as a SD memory card or a secure MMC having unique medium identification information (ID) for each medium.

Although the embodiments described above use the on-vehicle audio system 1 as an example of an electronic device, the invention is not limited to such a system but applicable equally to the on-vehicle AV (audio visual) device, the on-vehicle navigation system and the on-vehicle AV navigation system, and further, devices other than on-vehicle devices such as an audio system and an AV equipment installed in a building for home or business use.

In the embodiments described above, the encryption calculation circuit of the memory card control unit 15 may be configured in software, i.e. in such a manner that a predetermined security program is executed by the CPU, as well as in hardware. The function of the encryption calculation circuit of the memory card control unit 15 may be performed by the CPU of the system control unit 17 by executing a predetermined security program (in this case, the encrypted information write means, the encrypted information read means and the decryption execution means according to this invention correspond to the system control unit 17). Further, this security program may be downloaded from a predetermined server on the internet, for example, or recorded in a recording medium such as a flexible disk (CD-ROM, etc.) and read through the drive of the particular recording medium.

This invention is not limited to the aforementioned embodiments. The aforementioned embodiments are illustrative, and all embodiments having substantially the same configuration and operational effects as the technical concept described in the appended claims of the invention are included in the technical scope of the invention.

The entire disclosure of the Japanese Patent Application No. 2004-058444 filed on Mar. 3, 2004 and including the specification, the claims, the drawings and the abstract thereof are hereby incorporated by reference.

The invention claimed is:

1. An electronic device, comprising:
  a mounting device which loads a portable recording medium; and
  an encrypted information write device which writes encrypted information obtained by encrypting predetermined information using an electronic device unique key unique to the electronic device, and an electronic device unique key encrypted using a recording medium unique key unique to the recording medium, in the recording medium;
  the electronic device further comprising:
  an authentication device which authenticates medium identification information for identifying the recording medium, and device identification information for identifying the electronic device, in the case where the recording medium is mounted on the mounting device;
  a key generating device which generates a common encryption key for encrypting or decrypting the electronic device unique key in accordance with the authentication result of the authentication device;
  an encrypted information read device which reads the encrypted information recorded in the recording medium, and the encrypted electronic device unique key;
  an acquiring device which forwards the read electronic device unique key to a control portion for the recording medium, and acquiring the electronic device unique key encrypted by the common encryption key from the control portion, after the electronic device unique key is decrypted by the recording medium unique key in the control portion;
  a decryption execution device which decrypts the acquired electronic device unique key by the common encryption key, and executing the decryption of the encrypted information using the decrypted electronic device unique key; and a control device which sets the electronic device in usable mode in the case where the encrypted information is decrypted by the decryption execution device.

2. The electronic device as set forth in claim 1, further comprising a volatile memory for holding the information, and a load request device which determines whether the memory is in the information holding mode in the case where power is supplied to the electronic device with the recording medium not loaded in the mounting device, and in the case where the memory is not in the information holding mode, prompting the user to load the recording medium.

3. The electronic device as set forth in claim 1, wherein the control device determines whether the information obtained by decrypting the encrypted information and the preset information coincide with each other, and in the case where they coincide with each other, sets the electronic device in usable mode.

4. The electronic device as set forth in claim 1, further comprising an alarm device which outputs an alarm in the case where the encrypted information is not decrypted by the decryption execution device.

5. A method of controlling an electronic device comprising:

a mounting device which loads a portable recording medium; and an encrypted information write device which writes encrypted information obtained by encrypting predetermined information using an electronic device unique key unique to the electronic device, and an electronic device unique key encrypted using a recording medium unique key unique to the recording medium, in the recording medium;

the method comprising the processes of:

authenticating medium identification information for identifying the recording medium, and device identification information for identifying the electronic device, in the case where the recording medium is mounted on the mounting device;

generating a common encryption key for encrypting or decrypting the electronic device unique key in accordance with the authentication result;

reading the encrypted information recorded in the recording medium, and the encrypted electronic device unique key;

forwarding the read electronic device unique key to a control portion for the recording medium, and acquiring the electronic device unique key encrypted by the common encryption key from the control portion, after the electronic device unique key is decrypted by the recording medium unique key in the control portion;

decrypting the acquired electronic device unique key by the common encryption key, and executing the decryption of the encrypted information using the decrypted electronic device unique key; and setting the electronic device in usable mode in the case where the encrypted information is decrypted.

6. A computer-readable recording medium in which a security program is recorded, said security program being characterized in that a computer included in an electronic device comprising:

a mounting device which loads a portable recording medium; and an encrypted information write device which writes encrypted information obtained by encrypting predetermined information using an electronic device unique key unique to the electronic device, and an electronic device unique key encrypted using a recording medium unique key unique to the recording medium, in the recording medium;

is caused to function as:

authenticating medium identification information for identifying the recording medium, and device identification information for identifying the electronic device, in the case where the recording medium is mounted on the mounting device;

generating a common encryption key for encrypting or decrypting the electronic device unique key in accordance with the authentication result;

reading the encrypted information recorded in the recording medium, and the encrypted electronic device unique key;

forwarding the read electronic device unique key to a control portion for the recording medium, and acquiring the electronic device unique key encrypted by the common encryption key from the control portion, after the electronic device unique key is decrypted by the recording medium unique key in the control portion;

decrypting the acquired electronic device unique key by the common encryption key, and executing the decryption of the encrypted information using the decrypted electronic device unique key; and setting the electronic device in usable mode in the case where the encrypted information is decrypted.

* * * * *

UNITED STATES PATENT AND TRADEMARK OFFICE
CERTIFICATE OF CORRECTION

PATENT NO.        : 7,680,280 B2
APPLICATION NO.   : 10/591420
DATED             : March 16, 2010
INVENTOR(S)       : Yoshiya Nonaka et al.

It is certified that error appears in the above-identified patent and that said Letters Patent is hereby corrected as shown below:

Title Page
In Section (73) "Assignees" on the front page of the above-identified patent, insert
--PIONEER SYSTEM TECHNOLOGIES CORPORATION, Sendai-shi, Miyagi, Japan--

Signed and Sealed this

Twenty-second Day of June, 2010

David J. Kappos
*Director of the United States Patent and Trademark Office*